(12) United States Patent
Kim

(10) Patent No.: US 11,042,766 B2
(45) Date of Patent: Jun. 22, 2021

(54) ARTIFICIAL INTELLIGENCE APPARATUS AND METHOD FOR DETERMINING INATTENTION OF DRIVER

(71) Applicant: LG ELECTRONICS INC., Seoul (KR)

(72) Inventor: Sungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/700,470

(22) Filed: Dec. 2, 2019

(65) Prior Publication Data

US 2021/0124962 A1 Apr. 29, 2021

(30) Foreign Application Priority Data

Oct. 29, 2019 (KR) .................. 10-2019-0135577

(51) Int. Cl.
*B60W 50/14* (2020.01)
*G06K 9/00* (2006.01)
*G06K 9/62* (2006.01)
*B60N 2/00* (2006.01)
*G06N 3/04* (2006.01)
*G06N 3/08* (2006.01)
*B60W 40/08* (2012.01)

(52) U.S. Cl.
CPC ......... *G06K 9/00845* (2013.01); *B60N 2/002* (2013.01); *B60W 40/08* (2013.01); *B60W 50/14* (2013.01); *G06K 9/00315* (2013.01); *G06K 9/6256* (2013.01); *G06N 3/04* (2013.01); *G06N 3/08* (2013.01); *B60W 2040/0818* (2013.01); *B60W 2050/143* (2013.01)

(58) Field of Classification Search
CPC .......................... G06K 9/00845; G06N 3/04
See application file for complete search history.

(56) References Cited

U.S. PATENT DOCUMENTS

2009/0322506 A1* 12/2009 Schmitz ............... B60K 28/066
340/439
2016/0288708 A1* 10/2016 Chang ................ G06K 9/00845
2018/0293429 A1* 10/2018 Wechsler ........... G06K 9/00926
2019/0111945 A1* 4/2019 Wiegand .............. G05D 1/0246

* cited by examiner

*Primary Examiner* — Jerry T Jean Baptiste
(74) *Attorney, Agent, or Firm* — Birch, Stewart, Kolasch & Birch, LLP

(57) ABSTRACT

Disclosed herein an artificial intelligence apparatus for determining inattention of a driver including a vibration sensor or a gyro sensor configured to sense movement of a driver's seat of a vehicle, a camera configured to receive image data including a face of a driver, a communication modem configured to receive vehicle status information from an ECU (Electronic Control Unit) of the vehicle, and a processor configured to generate movement information of the driver's seat using vibration sensor information received from the vibration sensor or gyro sensor information received from the gyro sensor, generate driver status information corresponding to the driver from the received image data, determine whether the driver is in an inattention status based on the movement information of the driver's seat, the driver status information and the vehicle status information, and output an inattention alarm if the driver is in the inattention status.

7 Claims, 15 Drawing Sheets

FIG. 10
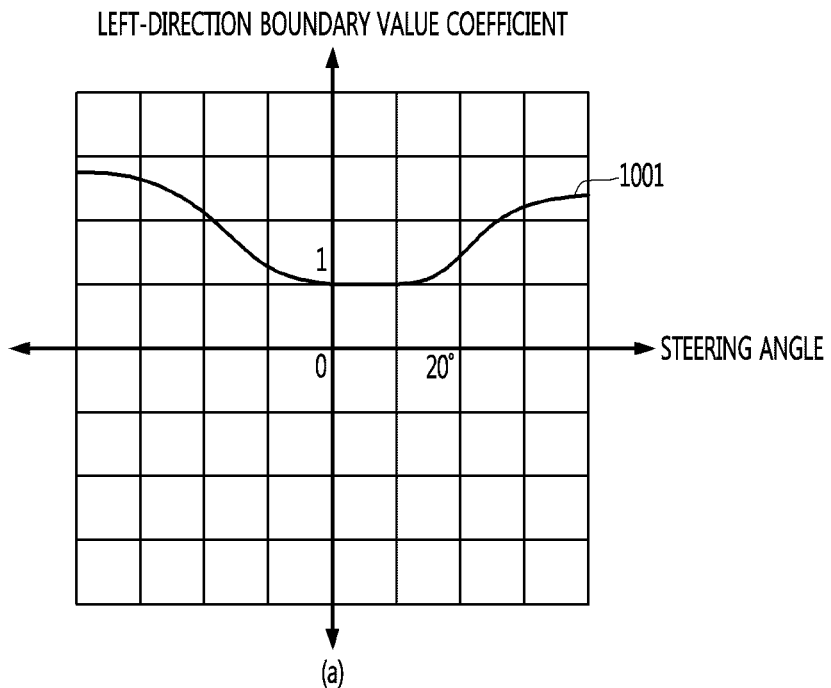
(a)
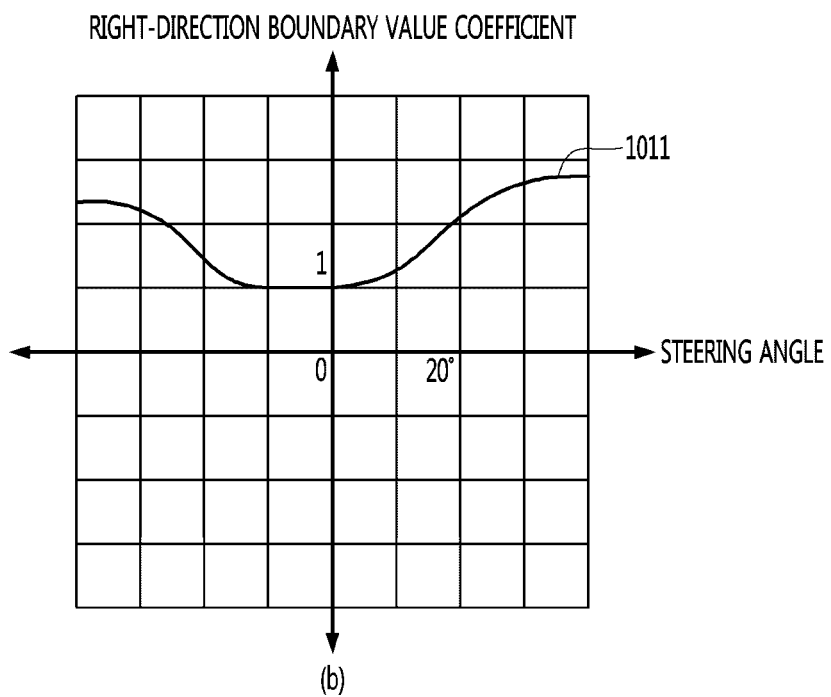
(b)

FIG. 12
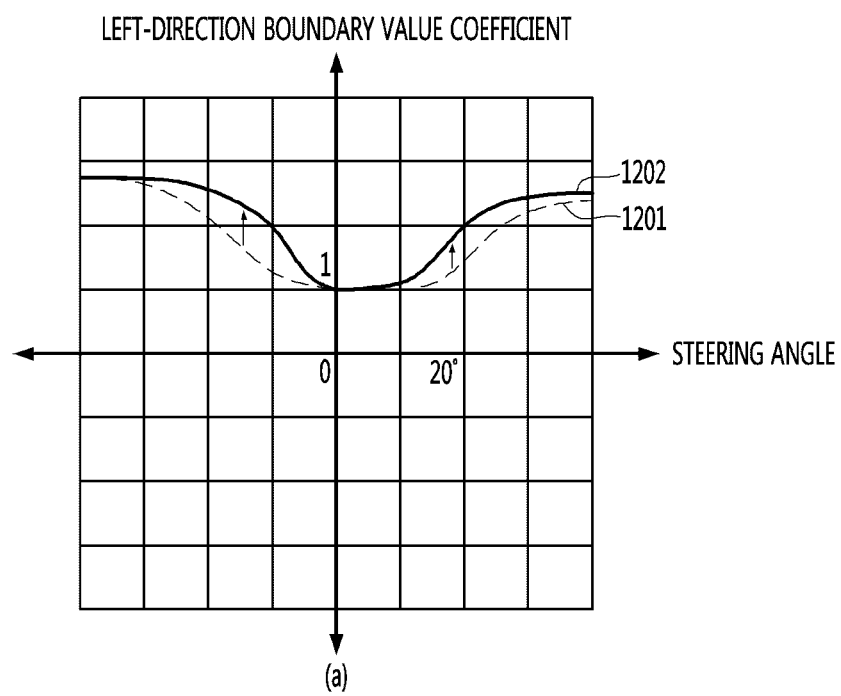
(a)
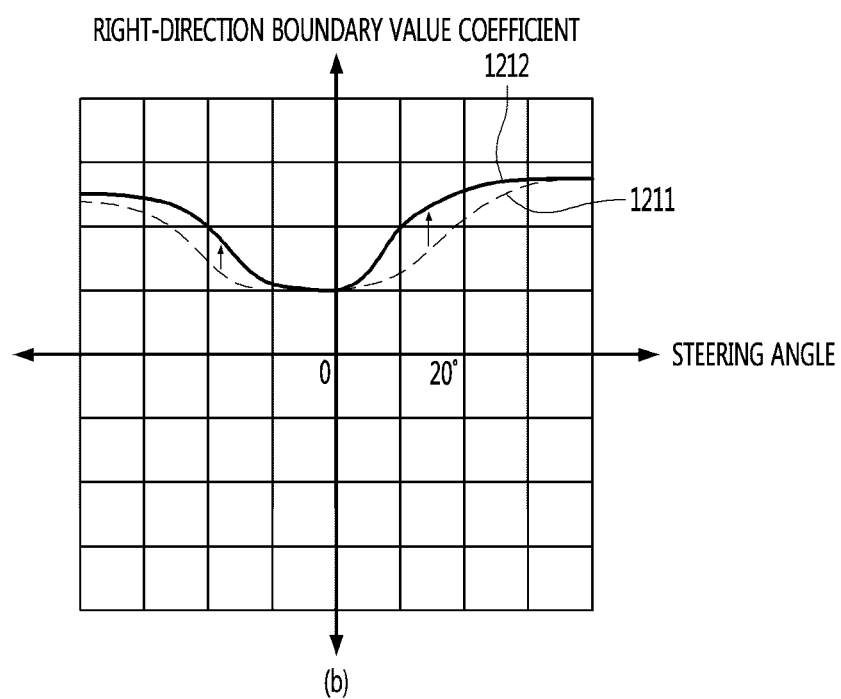
(b)

ARTIFICIAL INTELLIGENCE APPARATUS AND METHOD FOR DETERMINING INATTENTION OF DRIVER

CROSS-REFERENCE TO RELATED APPLICATIONS

This application claims priority to Korean Patent Application No. 10-2019-0135577 filed in the Republic of Korea on Oct. 29, 2019, the entire contents of which are hereby incorporated by reference in its entirety.

BACKGROUND

The present disclosure relates to an artificial intelligence (AI) apparatus and method for determining intention of a driver.

Recently, technology for providing a vehicle with a driving assistance function for assisting operation for driving of a driver or an automatic driving function for replacing operation for driving of a driver has been actively developed. The driving assistance function (or a driving assistance system) may include a cruise control function, a vehicle clearance adjustment function, a lane maintenance function, a driver status monitoring (DSM) function, etc. In addition, the automatic driving function may be regarded as including all driving assistance functions.

The DSM function means a function for monitoring the status of a driver, such as driver's fatigue, drowsiness or careless behavior while driving the vehicle and detect a high risk situation to provide an alarm or provide a necessary response, and contributes to reducing the direct cause of an accident, such as driving while drowsy. However, even if a driver focuses on driving, the DSM function may be likely to incorrectly determine inattention of the driver. When a wrong alarm is provided, driver's satisfaction may be lowered. Accordingly, it is important to accurately determine inattention of the driver when monitoring the status of the driver.

SUMMARY

An object of the present disclosure is to provide an artificial intelligence apparatus and a method for determining inattention of a driver and providing an inattention alarm upon determining that the driver is in an inattention status.

Another object of the present disclosure is to provide an artificial intelligence apparatus and a method for determining an inattention status by applying different criteria according to drivers.

Another object of the present disclosure is to provide an artificial intelligence apparatus and a method for determining the inattention status of a driver based on feedback of the driver upon determining that the driver is in the inattention status.

According to an embodiment, provided are an artificial intelligence apparatus and a method for generating movement information of a driver's seat of a vehicle, receiving vehicle status information, generating driver status information using image data including a face of a driver, determining whether the driver is in an inattention status based on the movement information of the driver's seat, the driver status information and the vehicle status information, and outputting an inattention alarm if the driver is in the inattention status.

According to an embodiment, provided are an artificial intelligence apparatus and a method for identifying a type of a vehicle and a driver, determining an inattention determination profile or an inattention determination model to be used to determine inattention of the driver using the identified information, and determining inattention of the driver using the determined inattention determination profile and the determined inattention determination model.

According to an embodiment, provided are an artificial intelligence apparatus and a method for updating a reference value or an inattention determination model used to determine inattention of a driver in consideration of feedback of the driver after an inattention alarm is provided.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 10 is a view illustrating a relationship between a steering angle and direction boundary value coefficients according to an embodiment of the present disclosure.

FIG. 12 is a view illustrating a relationship between an updated steering angle and a directional boundary value coefficients based on negative feedback according to an embodiment of the present disclosure.

DETAILED DESCRIPTION OF THE EMBODIMENTS

Figure 1:
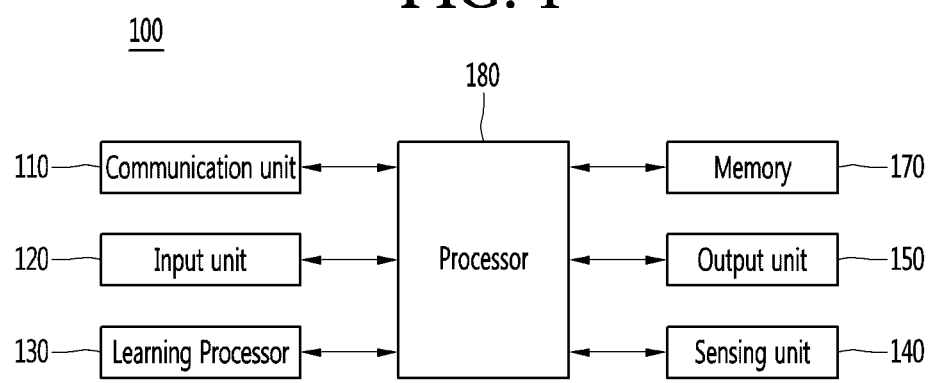
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<EXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
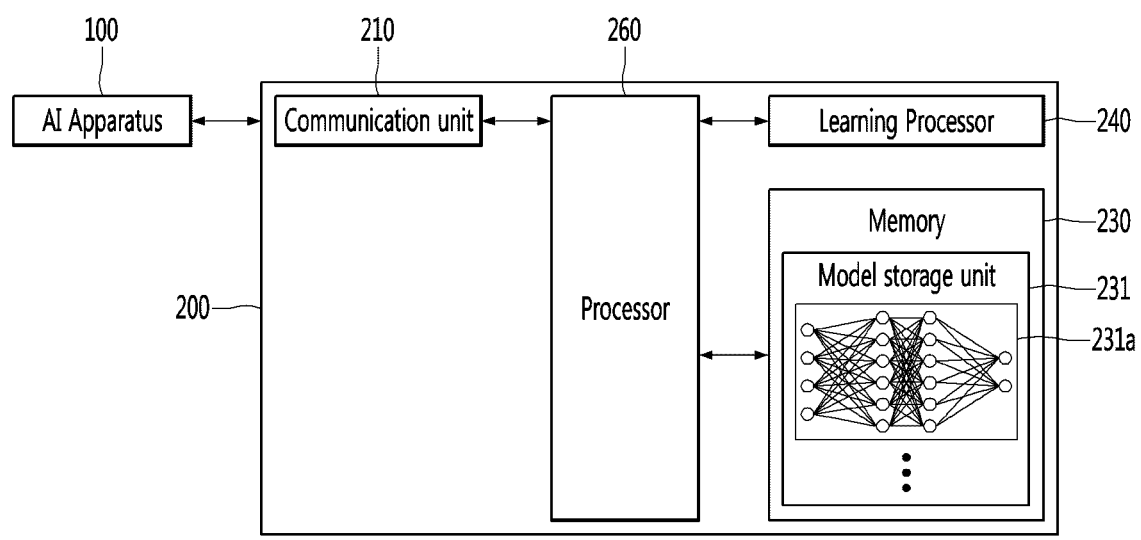
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
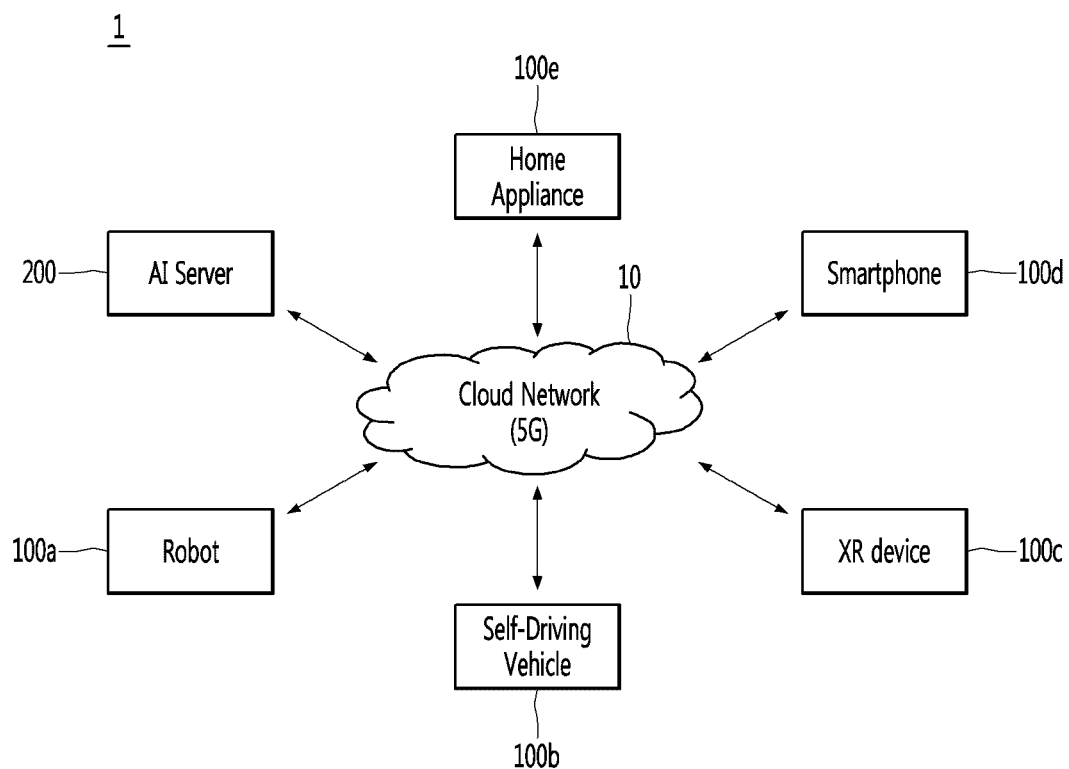
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
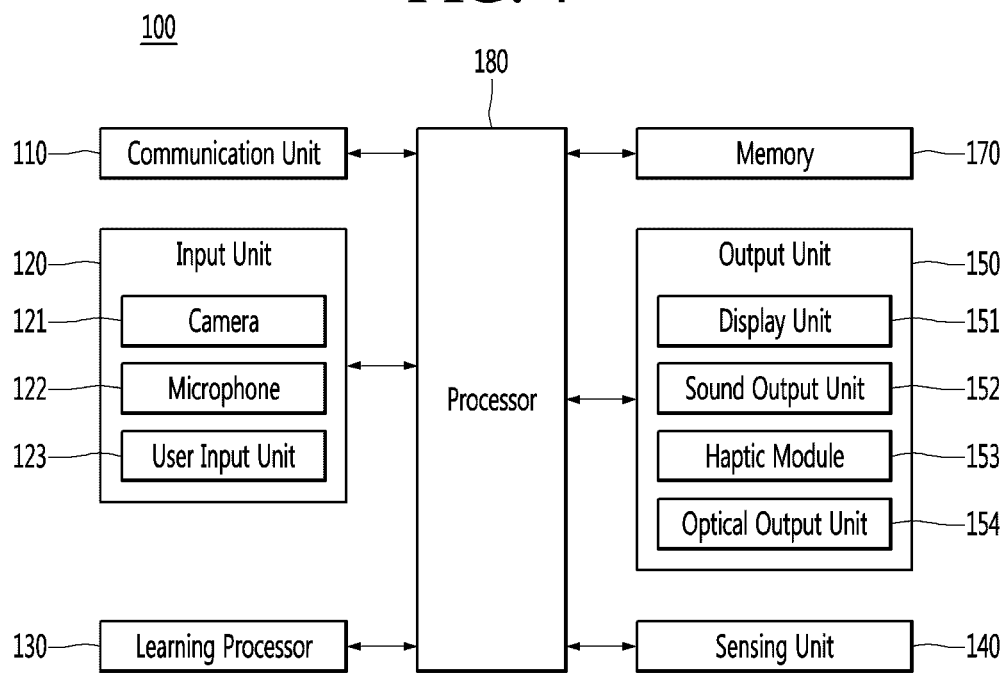
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication unit 110 may also be referred to as a communication modem or a communication circuit.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
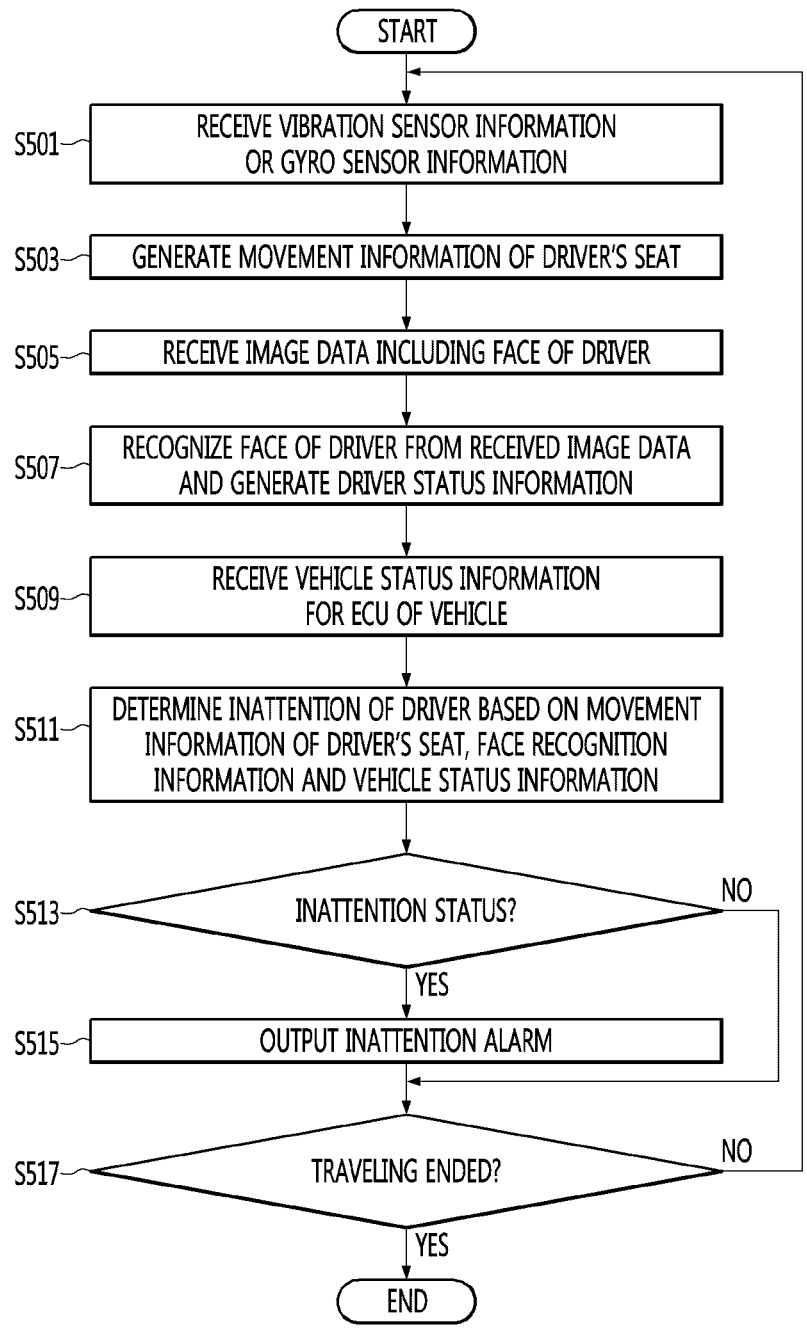
FIG. 5 is a flowchart illustrating a method of determining inattention of a driver according to an embodiment of the present disclosure.

FIG. 5 is a flowchart illustrating a method of determining inattention of a driver according to an embodiment of the present disclosure.

The method of determining inattention of the driver may be performed by the artificial intelligence apparatus 100. The artificial intelligence apparatus 100 may be mounted in a vehicle or may be a vehicle itself. In one embodiment, the artificial intelligence apparatus 100 may mean an apparatus for driving a driver status monitoring (DSM) system.

In the present disclosure, the vehicle means a means of transportation which moves as reaction to friction between wheels and a road surface by artificial power, and includes sedans, sports utility vehicles (SUVs), trucks and buses. The present disclosure is not limited by the shape or type of the vehicle. However, since a driver's behavior for driving varies depending on the type of the vehicle, a method of determining inattention of the driver may vary.

The processor 180 of the artificial intelligence apparatus 100 may perform the method of determining inattention of the driver when the vehicle starts to travel, when the vehicle is traveling or when the vehicle is preparing to travel.

Referring to FIG. 5, the processor 180 of the artificial intelligence apparatus 100 receives vibration sensor information or gyro sensor information (S501), and generates movement information of driver's seat (S503).

Typically, a vehicle such as a sedan or SUV is designed such that a driver's seat is fixed to a vehicle body and is moved along with the vehicle body. However, in a vehicle such as a truck or a bus, a driver's seat is connected to a vehicle body but may be further moved upward and downward independently of movement of the vehicle body. When the truck or the bus travels on a rough or curved road surface, the driver's seat may be moved upward and downward independently of the vehicle body. Therefore, even if the driver does not move, the position of the user in image data to be received via the camera 121 may vary.

The processor 180 may receive vibration sensor information or gyro sensor information via a vibration sensor or a gyro sensor provided in the driver's seat and generate movement information of the driver's seat using the received vibration sensor information or the received gyro sensor information.

The processor 180 may receive first vibration sensor information or first gyro sensor information via a first vibration sensor or a first gyro sensor provided in the driver's seat, receive second vibration sensor information or second gyro sensor information via a second vibration sensor or a second gyro sensor provided in a vehicle body (e.g., a dashboard, a ceiling, a rearview mirror, etc.), and obtain movement information of the driver's seat using the received first and second vibration sensor information or the received first and second gyro sensor information. In this case, the processor 180 may generate movement information of the driver's seat relative to movement of the vehicle body from a difference between the first vibration sensor information and the second vibration sensor information or the first gyro sensor information and the second gyro sensor information. In addition, the processor 180 may generate movement information of the vehicle body using the received second vibration sensor information or second gyro sensor information.

In addition, the processor 180 of the artificial intelligence apparatus 100 receives image data including the face of the driver via the camera 121 (S505).

The camera 121 may be installed in the vehicle in the front direction of the driver to receive the image data including the face of the user. For example, the camera 121 may be attached or fastened to the windshield, ceiling, dashboard or steering wheel of the vehicle. In some embodiments, the camera 121 may be additionally installed in the vehicle in the lateral direction of the driver to additionally receive image data including the side face of the user. That is, the camera 121 is not limited to a single camera.

The camera 121 may include at least one of an RGB camera, an IR camera or a depth camera. If the camera 121 includes an RGB camera, the received image data may include RGB image data. If the camera 121 includes an infrared camera, the received image data may include infrared image data. If the camera 121 includes a depth camera, the received image data may include depth image data.

In one embodiment, the processor 180 may correct the image data to compensate for movement of the driver's seat based on the obtained movement information of the driver's seat. For example, if the driver's seat is recognized as being moved upward from a basic state by 5 cm, the image data may be corrected by moving the image data downward by an amount (e.g., 1 cm) obtained by multiplying 5 cm by a predetermined ratio. By correcting the image data based on the movement information of the driver's seat, it is possible to minimize movement of an area, in which the face of the driver is located, in the image data.

In addition, the processor 180 of the artificial intelligence apparatus 100 recognizes the face of the driver from the received image data to generate driver status information (S507).

Recognizing the face of the driver may mean simply recognizing the face of a person or identifying the driver along with the face of the driver. To this end, the processor 180 may recognize the face of the user using a face recognition model to generate driver status information. The face recognition model may be an artificial neural network including a convolutional neural network (CNN) learned using a deep learning algorithm.

The driver status information may include at least one of the identification information of the driver, the face direction of the driver, the gaze direction of the driver, a degree to which the driver's eyes are closed (or a distance between eyelids), a degree to which the driver's mouth is open (or a distance between lips) or whether the driver is drowsing.

The identification information of the driver may be face shape based identification information generated by extracting feature points from the face of the driver or iris shape based identification information generated by extracting feature points from the iris of the driver's eye.

The face direction of the driver and the gaze direction of the driver may be expressed by an angle from the front surface of the vehicle in upward, downward, left and right directions. For example, when the face of the driver faces the front center of the vehicle, the face direction of the driver may be expressed by 0 degrees in an upward-and-downward direction and 0 degrees in a left-and-right direction. In addition, when the driver looks to the right, the left-and-right angle may be expressed by +n degrees and, when the driver looks upward, the upward-and-downward angle may be expressed by +m degrees. The method of expressing the angle representing each direction is merely an example and any expression method indicating the upward, downward, left and right directions may be used. The face direction of the driver may mean the head pose of the driver.

The degree to which the eyes of the driver are closed may be expressed by a numerical number of the distance between eyelids of each eye of the driver or may be expressed by a ratio a current distance between eyelids to a maximum value of the distance between the eyelids of the driver. For example, the degree to which the eyes of the driver are closed may be expressed as 6 mm for the left eye and 7 mm for the right eye. As the degree to which the eyes of the driver are closed, any expression method indicating the degree to which the eyes are closed may be used. In addition, the degree to which the eyes of the driver are closed may be expressed by the size of the recognized pupil of the driver. This is because the size of the recognized pupil decreases as the driver's eyes are closed.

The degree to which the driver's mouth is open may be expressed by the numerical value of the distance between the lips of the driver or a ratio of a current distance between the lips to a maximum value of the distance between the lips of the driver. For example, the degree to which the driver's mouth is open may be expressed as 35 mm. As the degree to which the driver's mouth is open, any expression method indicating how wide the mouth is open may be used.

Whether the driver is drowsing may be simply expressed by yes and no or may be expressed by a real number between 0 and 1 as a degree of drowsiness.

In one embodiment, the processor 180 may perform initialization or calibration for obtaining driver status information before starting driving, for example, at the time of starting. That is, in order to set a reference value for the front direction of the gaze direction of the driver or the face direction of the driver included in the driver status information, the driver may be guided or induced to look to the front, and the face direction or the gaze direction recognized from the image data received in a state in which the driver looks to the front may be set to the front direction.

In addition, the processor 180 of the artificial intelligence apparatus 100 receives vehicle status information from an electronic control unit (ECU) of the vehicle via the communication unit 110 (S509).

If the artificial intelligence apparatus 100 is configured to be separated from the vehicle, the artificial intelligence apparatus 100 may receive the vehicle status information from the ECU of the vehicle using wired/wireless communication such as a controller area network (CAN) via the communication unit 110. In contrast, if the artificial intelligence apparatus 100 is configured as the vehicle itself, the processor 180 of the artificial intelligence apparatus 100 may receive the vehicle status information from the ECU. The signal received from the ECU may also be referred to as a CAN signal.

The ECU of the vehicle is a control unit for controlling an engine, a transmission, a brake, etc. of the vehicle and collects sensor information from various types of sensors mounted in the vehicle. For example, the sensor information collected by the ECU may include a vehicle speed, a revolutions per minute (RPM) of the engine, a transmission gear state, pedal pressure, a steering angle, a lighting state of a turn signal lamp, etc., and the collected sensor information may configure the vehicle status information.

In addition, the processor 180 of the artificial intelligence apparatus 100 determines inattention of the driver based on movement information of the driver's seat, the driver status information and the vehicle status information (S511 and S513).

The method of determining inattention of the driver may include a rule-based determination method and a machine learning-based determination method.

The method of determining inattention of the driver will be described.

If the driver is in the inattention status as the result of determination of step S513, the processor 180 of the artificial intelligence apparatus 100 outputs an inattention alarm (S515).

The inattention alarm may include an alarm for notifying the driver of the inattention status or an alarm for calling the driver's attention.

The processor 180 may output a voice alarm, a beep alarm, a predetermined sound alarm, etc., which notifies the driver of inattention via the sound output module 152. For example, the processor 180 may output, via the sound output module 152, a voice alarm "You are currently in the inattention status. Please drive carefully", a warning alarm of a beep or a predetermined sound or music alarm as the inattention alarm.

The processor 180 may output, via the display unit 151, an image alarm which notifies the driver of inattention. For example, the processor 180 may output, via a head-up display (HUD) of the vehicle, a text alarm "You are currently in the inattention status. Please drive carefully" as the inattention alarm. In particular, the processor 180 may output the inattention alarm on the window, to which the driver looks, via the HUD.

The processor 180 may generate vibration notifying the driver of inattention via the haptic module 153. For example, the processor 180 may output the inattention alarm by driving a motor installed in a car seat upon determining that the driver is in the inattention status. For example, if the car seat of the vehicle provides a massage function, the processor 180 may output the inattention alarm, by performing at least a part of the massage function of the car seat upon determining that the driver is in the inattention status.

The processor 180 may output a lamp alarm notifying the driver of inattention via the optical output unit 154. For example, the processor 180 may output an alarm indicating that the driver is currently in the inattention status, by turning on a warning lamp installed on the dashboard of the vehicle.

If the driver is not in the inattention status as the result of determination of step S513 or if step S515 is performed, the processor 180 of the artificial intelligence apparatus 100 determines whether traveling has ended (S517).

The processor 180 may determine whether traveling has ended, by determining whether the engine or the motor is in operation.

If traveling has not ended as the result of determination of step S517, the method returns to step S501.

If the vehicle is still traveling, necessary data and information are received again to determine the inattention of the driver.

If traveling has ended as the result of determination of step S517, the procedure for determining the inattention of the driver ends.

The processor 180 may determine whether traveling has ended based on the vehicle status information received from the ECU of the vehicle. For example, if gear information included in the vehicle status information is a parking gear or if the vehicle status information is not received from the ECU as the vehicle is turned off, the processor 180 may determine that traveling has ended.

FIG. 5 shows only one cycle of the method of determining the inattention of the driver according to one embodiment. The steps shown in FIG. 5 may be repeatedly performed and thus the artificial intelligence apparatus 100 may repeatedly determine the inattention of the driver.

The order of the steps shown in FIG. 5 is merely an example and the present disclosure is not limited thereto. That is, in one embodiment, the order of some of the steps shown in FIG. 5 may be reversed. In addition, in one embodiment, some of the steps shown in FIG. 5 may be performed in parallel.

Figure 6:
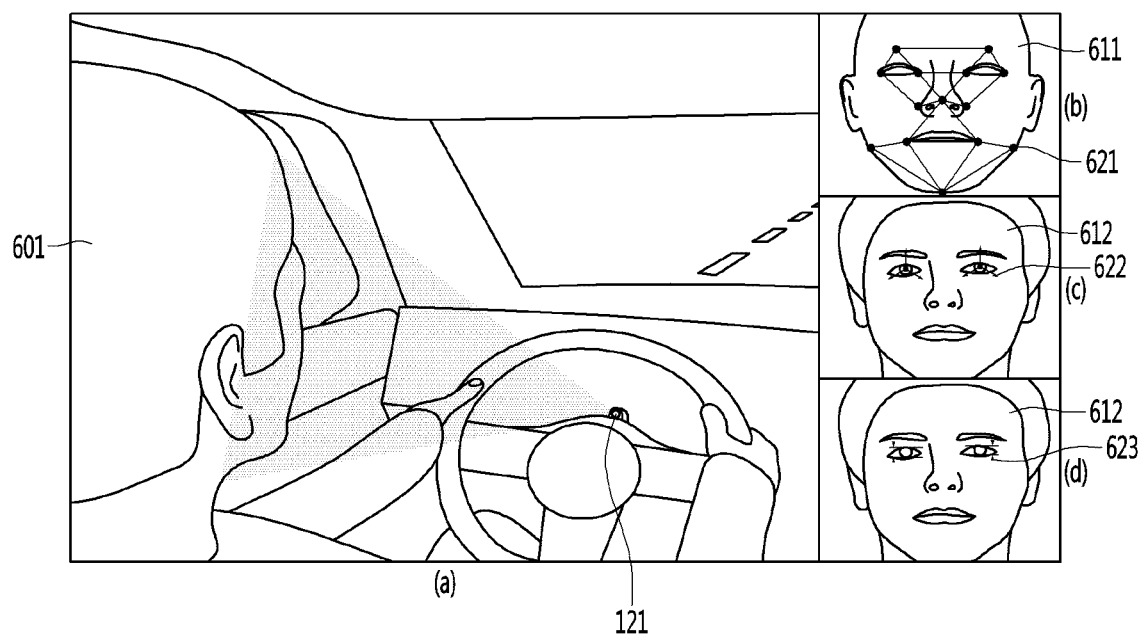
FIG. 6 is a view illustrating a method of generating face recognition information according to an embodiment of the present disclosure.

FIG. 6 is a view illustrating a method of generating face recognition information according to an embodiment of the present disclosure.

Referring to FIG. 6(*a*), the processor 180 may obtain image data 611 and 612 including the face of a driver 601 through a camera 121 installed inside a vehicle. For example, the processor 180 may obtain depth image data 611 using a depth camera, and may obtain RGB image data 612 using a typical RGB camera.

Figure 9:
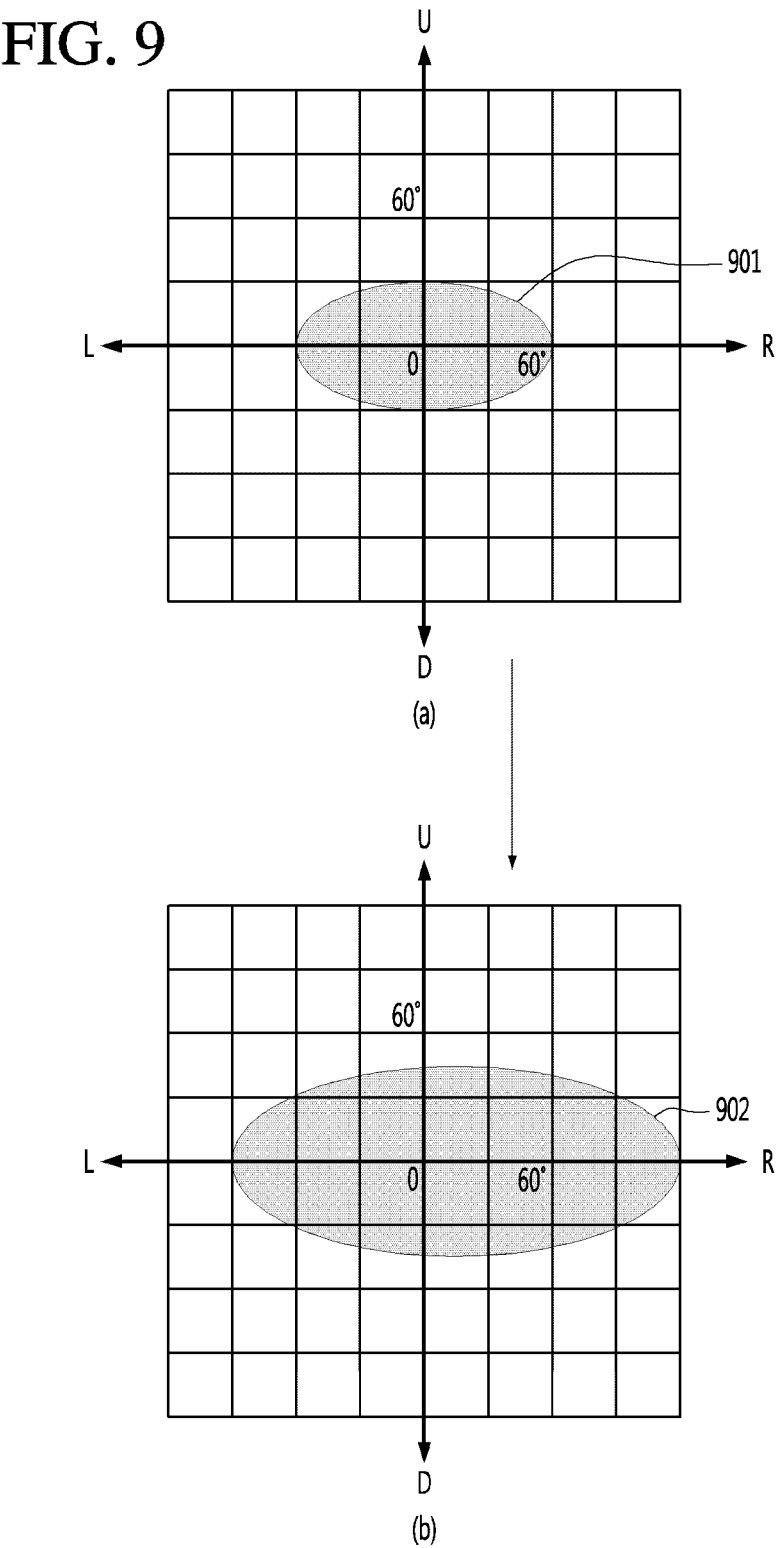

Referring to FIG. 9(*b*), the processor 180 may extract features from the face of the driver 601 from depth image data 611 to recognize the face (621). The processor 180 may identify a plurality of drivers by distinguishing between the plurality of drivers, determine the head direction of the driver, or determine whether the user is opening the mouth of the user, through the face recognition.

Referring to FIG. 9(*c*), the processor 180 may recognize the eyes of the driver 601 from the RGB image data 612 (622). The recognizing of the eyes (622) may include recognizing the gaze direction.

Referring to FIG. 9(*d*), the processor 180 may recognize whether the driver 961 closes the eyes, or recognize eyelids of the driver from the RGB image data 612 (623). The recognizing of whether the driver closes the eyes (623) may be determined by measuring the distance between the eyelids, or by determining whether the eyeball is not recognized at the position of the eyeball.

As such, the processor 180 may distinguish the drivers from each other and determine whether the driver is yawning by recognizing the face of the driver 601. Also, the processor 180 may determine whether the driver 601 gazes the side window, the side mirror or the room mirror by recognizing the eyeballs of the driver 601. Also, the processor 180 may determine whether the driver 601 is drowsing by recognizing the eyelid of the driver 601.

Figure 7:
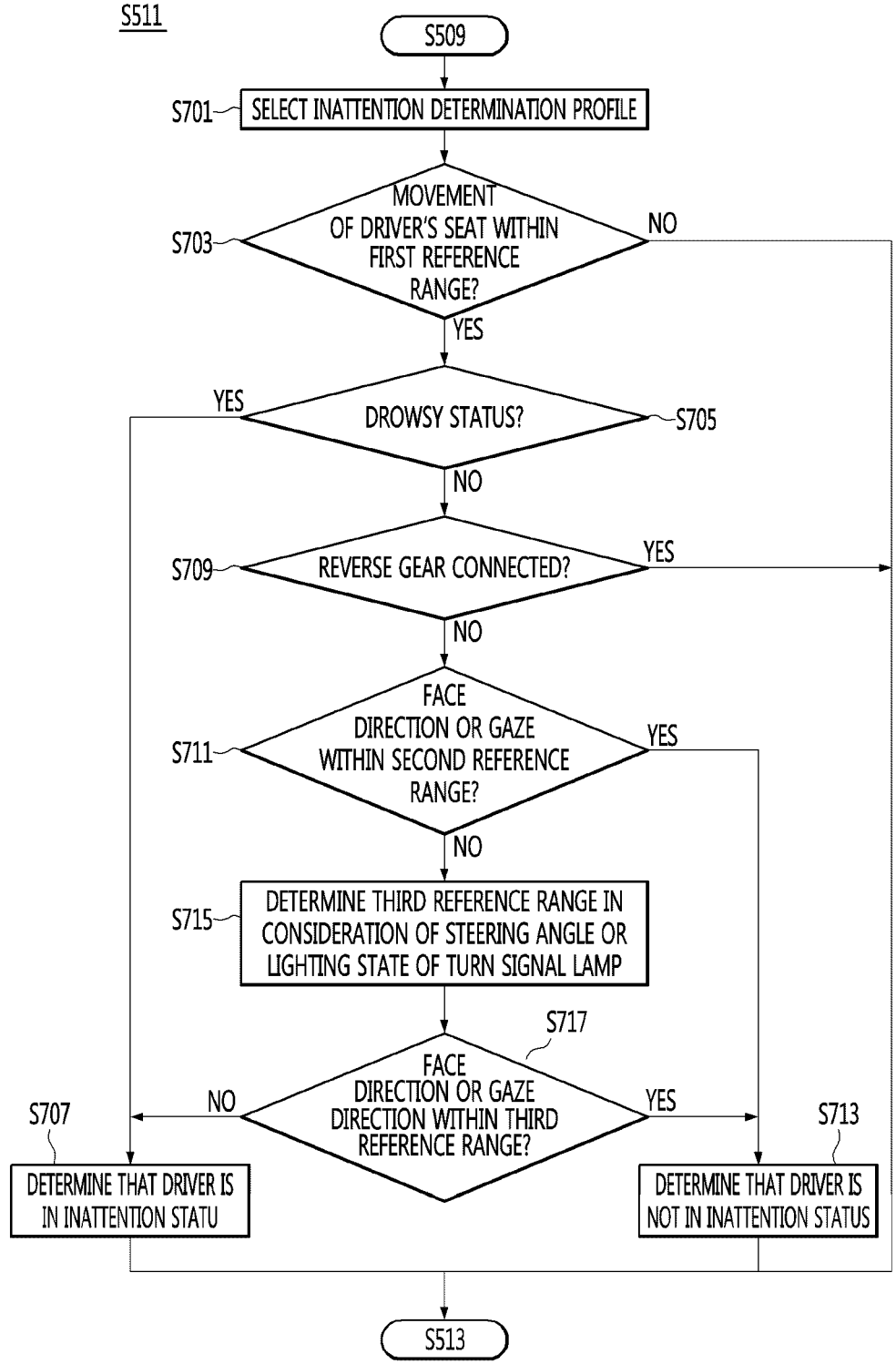
FIG. 7 is a flowchart illustrating an example of step S511 of determining inattention of a driver illustrated in FIG. 5.

FIG. 7 is a flowchart illustrating an example of step S511 of determining inattention of a driver illustrated in FIG. 5.

FIG. 7 shows an example of a method of determining the inattention of the driver using a rule-based inattention determination model among the methods of determining the inattention of the driver.

Referring to FIG. 7, the processor 180 of the artificial intelligence apparatus 100 selects an inattention determination profile to be used to determine the inattention of the driver (S701).

The inattention determination profile may be a collection of reference values used to determine the inattention of the driver and may include a reference range or boundary values described below.

The inattention determination profile may be classified according to the type of the vehicle, and the base value of the reference range or boundary value included in the inattention determination profile may be set according to the type of the vehicle. For example, the base value of the reference range and the boundary value included in the inattention determination profile of a sedan may be different from that of the reference range and the boundary value included in the inattention determination profile of a truck. That is, the base value (or initial value) of the reference value to be used to determine the inattention of the driver may be determined based on the type of the vehicle.

In addition, the inattention determination profile may be classified according to the driver, and the reference range or boundary values included in the inattention determination profile may be set for each the driver. For example, the reference range and boundary value included in the inattention determination profile of a first driver may be different from the reference range and boundary value included in the inattention determination profile of a second driver. That is, the reference values to be used to determine the inattention of the driver may be differently determined according to the driver. This is because driving habits differ between drivers.

Accordingly, the processor 180 may select an inattention determination profile based on the type of the vehicle, in which the artificial intelligence apparatus 100 is installed, and a current driver. The current driver may be determined from driver identification information obtained from the received image data.

In addition, the processor 180 of the artificial intelligence apparatus 100 determines whether movement of the driver's seat is within a first reference range (S703).

The movement information of the driver's seat may include how much the driver's seat has moves upward and downward. If the vehicle travels on a bad road surface or a curved road, the driver's seat may move a lot. In addition, when the driver's seat moves a lot, the entire face of the driver may not be included in the image data received from the camera 121 or a lot of afterimages may be included, thereby failing to generating the driver status information or decreasing the accuracy of the generated driver status information. Movement of the driver's seat being within the first reference range may mean that movement of the driver's seat is not large. In contrast, the driver's seat being not within the first reference range may mean that movement of the driver's seat is large.

The first reference range may be a reference range included in the inattention determination profile selected in step S701. That is, the first reference range may mean a movement reference range of the driver's seat, and the first reference range used in step S703 is a movement reference range of the driver's seat selected in step S701. For example, the first reference range may be within 10 centimeters from a base state upward and downward.

If movement of the driver's seat is not within the first reference range as the result of determination of step S703, the processor 180 of the artificial intelligence apparatus 100 ends the procedure without determining the inattention of the driver. That is, the procedure progresses to step S513 of determining whether the driver is in the inattention state.

If movement of the driver's seat is not within the first reference range, this may mean that the driver's seat has moved too much to determine the status of the driver and thus may be regarded as being inadequate to determine the inattention of the driver. Accordingly, in this case, the processor 180 may end step S511 of determining the inattention of the driver without determining the inattention of the driver. Since the inattention of the driver is not determined, this means that it is not determined that the driver is in the inattention status and thus the processor 180 may not provide the driver with the inattention alarm.

If the driver's seat has moved a lot, it can be expected that the driver does not drowse or the attention of the driver is not distracted, safety problems may be regarded as not occurring even if the inattention of the driver is not determined.

If the movement of the driver's seat is within the first reference range as the result of determination of step S703, the processor 180 of the artificial intelligence apparatus 100 determines whether the driver is in a drowsy status (S705).

The processor 180 may determine whether the driver is in a drowsy status or how close the user is to the drowsy status, in consideration of at least one of a degree to which the driver's eyes are closed (or the difference between the eyelids), the degree to which the mouth is open or the face direction (or the head direction) of the driver. For example, the processor 180 may recognize the yawn of the driver based on the degree to which the mouth is open, and recognize whether the driver's head nods based on the face direction of the driver. The processor 180 may determine whether the driver is in a drowsy status or how close the user is to the drowsy status, in consideration of how many the driver yawns, how narrow the distance between the eyelids is, or how many the driver's head nods.

If the processor 180 determines how close the driver is to the drowsy status, the score of drowsiness indicating how close to the drowsy status may be calculated and, if the calculated score of drowsiness exceeds a predetermined boundary value, it may be determined that the driver is in a drowsy status.

In addition, the processor 180 may determine a drowsy status using the reference values included in the inattention determination profile. For example, the processor 180 may compare the count of yawns of the driver with a yawn count reference value during a predetermined time (e.g., 5 minutes) using the yawn count reference value included in the inattention determination profile, and determine the drowsy status of the driver based on the result of comparison.

If the driver is in the drowsy status as the result of determination of step S705, the processor 180 of the artificial intelligence apparatus 100 determines that the driver is in the inattention status (S707).

If the driver is not in the drowsy status as the result of determination of step S705, the processor 180 of the artificial intelligence apparatus 100 determines whether a reverse gear is connected (S709).

The transmission gear state may include which gear is currently connected to the transmission. If the vehicle is connected to the reverse gear, the driver will want to check the side and the rear of the vehicle as well as the front of the vehicle, in order to move backward. Accordingly, the movement of the head or face and eyes of the driver in a state in which the reverse gear is connected may be greater than the movement of the head or face and eyes of the driver in the drive gear state.

If the reverse gear is connected as the result of determination of step S709, the processor 180 of the artificial intelligence apparatus 100 ends the procedure without determining the inattention of the driver. That is, the procedure progresses to step S513 of determining whether the driver is in the inattention status.

Alternatively, the processor 180 of the artificial intelligence apparatus 100 may determine that the driver is not in the inattention status.

If the reverse gear is not connected as the result of determination of step S709, the processor 180 of the artificial intelligence apparatus 100 determines whether the face direction of the driver or the gaze direction of the driver is within a second reference range (S711).

The second reference range is a basic determination range for presenting the face direction of the driver or the gaze direction of the driver when driving is normally performed. For example, the second reference range may be within 30 degrees in an upward-and-downward direction and within 60 degrees in a left-and-right direction. If the face direction or gaze direction of the driver is within the second reference range, the driver may be regarded as being not in the inattention status, regardless of whether the vehicle is going straight or turning.

If the face direction of the driver or the gaze direction of the driver is within the second reference range as the result of determination of step S711, the processor 180 of the artificial intelligence apparatus 100 determines that the driver is not in the inattention status (S713).

If the face direction of the driver or the gaze direction of the driver is not within the second reference range as the result of determination of step S711, the processor 180 of the artificial intelligence apparatus 100 determines a third reference range in consideration of a steering angle or a lighting state of a turn signal lamp (S715).

The third reference range is modified from the second reference range, in order to more accurately determine the inattention status of the driver in consideration that the field of vision of the driver widens in a state in which the vehicle is turning.

When a steering angle is large, the driver may frequently look in a direction corresponding to the steering angle. For example, in a situation in which the steering wheel has been turned clockwise in advance for a right turn or in a situation in which the steering wheel has been turned clockwise during a right turn, the driver may basically look to the right a lot for safety and additionally look to the left. Accordingly, the processor 180 may determine the third reference range obtained by modifying the second reference range in consideration of the steering angle, and the determined third reference range may be used as a criterion for determining the inattention status of the driver.

The turn signal lamp may be turned on in a situation in which turning is prepared as well as the case where the driver is turning, thereby representing the driver's intention to turn. Even if the driver turns on the turn signal lamp with the intention to turn, the steering wheel may not be immediately turned at that time. Since the driver turns on the turn signal lamp and look to the side for safety, even if the steering angle is not changed, it is necessary to determine whether the driver is in the inattention status in consideration of turning.

The processor 180 may determine the third reference range, by multiplying an upward-direction threshold value by an upward-direction threshold value coefficient, multiplying a downward-direction threshold value by a downward-direction threshold value coefficient, multiplying a left threshold value by a left threshold value coefficient, and multiplying a right-direction threshold value by a right-direction threshold value coefficient in the second reference range, using the upward-direction threshold value coefficient, the downward-direction threshold value coefficient, the left-direction threshold value coefficient, and the right-direction threshold value coefficient included in the inattention determination profile.

Each direction threshold value coefficient may be dependent on the steering angle. For example, each direction threshold value coefficient when the steering angle is 10 degrees in the right direction may be different from each direction threshold value coefficient when the steering angle is 30 degrees in the right direction. For example, each direction threshold value coefficient may be expressed as an increasing function of the absolute value of the steering angle. In contrast, since the turn signal lamp is expressed by a discrete value unlike the steering angle, each direction threshold coefficient may be dependent on which turn signal lamp is turned on.

If the steering angle is 0 degrees and the turn signal lamp is not turned on, all the direction threshold value coefficients may be 1. This means that the third reference range is determined equally to the second reference range.

Since the inattention determination profile may be set for each vehicle and driver, each direction threshold value coefficient may be differently set according to driver and the third reference range may be differently set according to driver. In addition, the direction threshold value coefficients set according to driver may be adjusted based on the feedback of the driver. For example, although it is determined that the driver is in the inattention status when the third reference range determined using the currently determined direction threshold value coefficients is used, if the driver provides feedback indicating that the driver is not in the inattention status, the processor 180 may adjust the direction threshold value coefficients such that the face direction or gaze direction of the driver at the time of wrong determination is included in the third reference range based on the acquired feedback. Alternatively, each driver may set the direction threshold value coefficients via direct input.

In addition, the processor 180 of the artificial intelligence apparatus 100 determines whether the face direction of the driver or the gaze direction of the driver is within the determined third reference range (S717).

If the face direction of the driver or the gaze direction of the driver is within the determined third reference range as the result of determination of step S717, the processor 180 of the artificial intelligence apparatus 100 determines that the driver is not in the inattention status (S713).

If the face direction of the driver or the gaze direction of the driver is not within the determined third reference range as the result of determination of step S717, the processor 180 of the artificial intelligence apparatus 100 determines that the driver is in the inattention status (S707).

In some embodiments, the processor 180 may determine that the driver is in the inattention status as soon as the face direction of the driver or the gaze direction of the driver is out of the third reference range or may determine that the driver is in the inattention status in consideration of a period in which the face direction of the driver or the gaze direction of the driver is out of the determined third reference range. For example, even if the driver turns their head for less than one second and both the face direction and gaze direction of the driver are out of the third reference range, the processor 180 may not determine that the driver is in the inattention status for such temporary movement. In contrast, when both the face direction and gaze direction of the driver are out of the third reference range for a predetermined time or more (e.g., 3 seconds or more), the processor 180 may determine that the driver is in the inattention status.

If a problem does not occur in the result even when the order of the steps shown in FIG. 7 is changed, the order of the steps may be changed. Similarly, if a problem does not occur in the result even when the steps shown in FIG. 7 are performed in parallel, the steps may be performed in parallel.

The steps shown in FIG. 7 are merely an example of implementing the method of determining the inattention of the driver, and the present disclosure is not limited thereto. For example, the processor 180 of the artificial intelligence apparatus 100 may determine that the driver is in the inattention status, when the speed continuously decreases or increases as compared to the maximum speed of the road on which the vehicle is currently traveling. Alternatively, the processor 180 of the artificial intelligence apparatus 100 may determine that the driver is in the inattention status, when the pressure of the acceleration pedal decreases and the speed of the vehicle continuously decreases or decreases to a predetermined reference value or less in a situation in which the vehicle is traveling on an expressway.

In particular, the processor 180 of the artificial intelligence apparatus 100 may determine whether it is backlight against the driver through the illuminance sensor or based on the brightness of the pixels in the image data. In the case of backlight, since it is not easy for the driver to open their eyes or it is difficult to accurately recognize the gaze direction of the driver, the gaze direction or the degree to which the eyes are closed may not be considered as an element for determining inattention.

Figure 8:
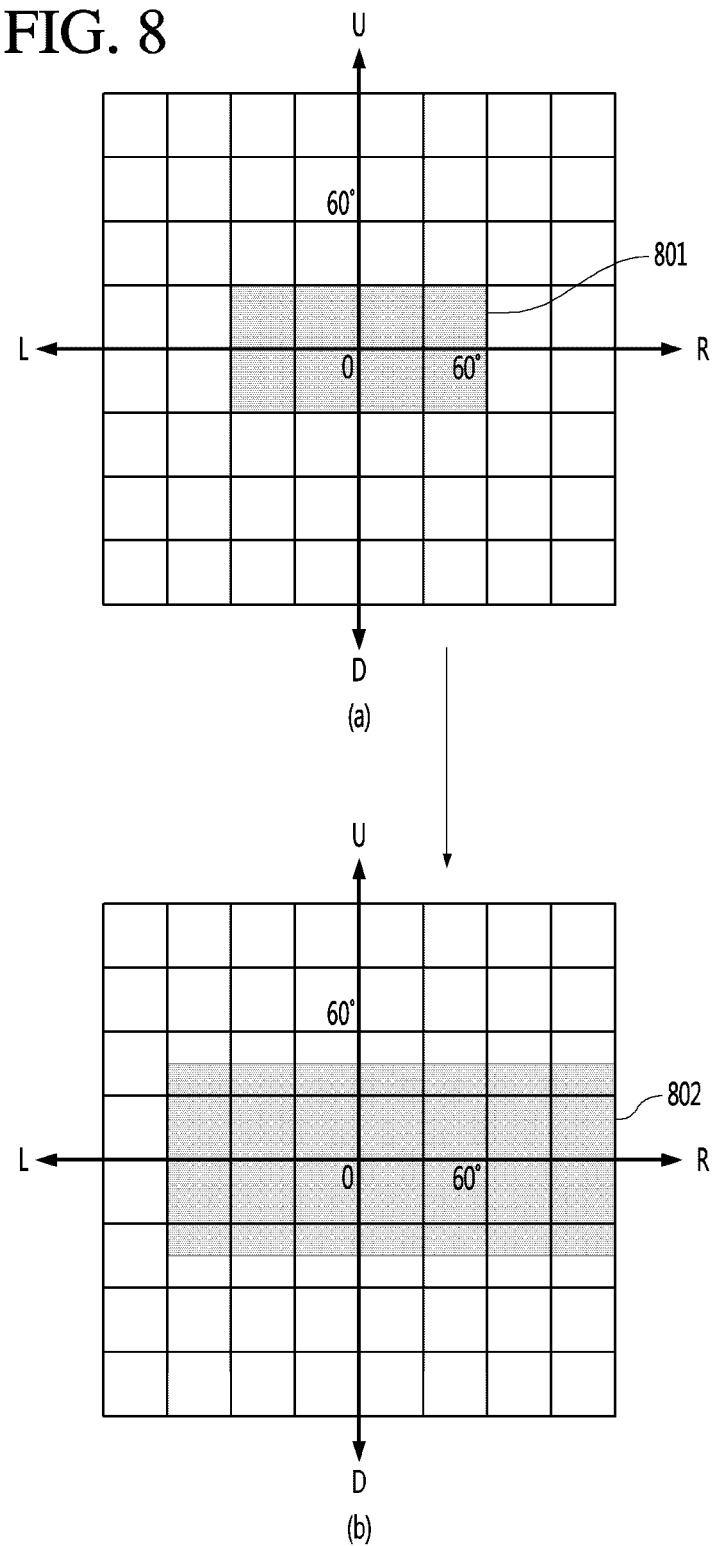
FIGS. 8 and 9 are views illustrating examples of a second reference range and a third reference range according to an embodiment of the present disclosure.

FIGS. 8 and 9 are views illustrating examples of a second reference range and a third reference range according to an embodiment of the present disclosure.

The second reference range and the third reference range correspond to the face direction or the gaze direction. (a) of FIG. 8 and (a) of FIG. 9 show the second reference range and (b) of FIG. 8 and (b) of FIG. 9 show the third reference range when the vehicle turns right. That is, (b) of FIG. 8 and (b) of FIG. 9 show the third reference range when the steering angle is in the right direction or when the right turn signal lamp is turned on.

Referring to FIGS. 8 and 9, the reference range corresponding to the face direction or the gaze direction may include an upward-direction threshold value, a downward-direction threshold value, a left-direction threshold value and a right-direction threshold value. Here, one column may be 30 degrees.

In the second reference range, the right-direction threshold value and the left-direction threshold value are 60 degrees and the upward-direction threshold value and the downward-direction threshold value are 30 degrees. In the third reference range, the right-direction threshold value is 120 degrees, the left-direction threshold value is 90 degrees and the upward-direction threshold value and the downward-direction threshold value are 45 degrees. In this case, the right-direction threshold value coefficient is 2, and the left-direction threshold value coefficient, the upward-direction threshold value coefficient and the downward-direction threshold value coefficient are 1.5.

The reference ranges shown in FIG. 8 are represented by rectangles in an orthogonal coordinates system, because the threshold values are independent of each other. However, the reference ranges shown in FIG. 9 are represented by ellipses instead of the rectangles in an orthogonal coordinates system, because the threshold values are dependent on each other. FIG. 9 is merely an example and the reference range corresponding to the face direction or the gaze direction may be represented by various shapes instead of ellipses.

In comparison between FIGS. 8 and 9, in a situation in which the driver looks at 60 degrees in the right direction and at 30 degrees in the upward direction, it is determined that the face or gaze direction of the driver is within the second reference range in the example of FIG. 8, but it is determined that the face or gaze direction of the driver is not within the second reference range in the example of FIG. 9.

FIG. 10 is a view illustrating a relationship between a steering angle and direction boundary value coefficients according to an embodiment of the present disclosure.

Referring to FIG. 10, the direction boundary value coefficients may be determined depending on the steering angle. In FIG. 10, the steering angle is represented on the x-axis, the positive direction of the x-axis means the steering angle in the right direction, and the negative direction of the x-axis means the steering angle in the left direction. In addition, one column of x-axis may be 10 degrees. In FIG. 10, the direction boundary value coefficient may be represented on the y-axis and one column of the y-axis may be 1.

(a) of FIG. 10 shows a relationship 1001 between the steering angle and the left-direction boundary value coefficient and (b) of FIG. 10 shows a relationship 1011 between the steering angle and the right-direction boundary value coefficient. The relationships 1001 and 1002 shown in FIG. 10 may be basic values equally applied to all drivers. The relationships 1001 and 1002 shown in FIG. 10 may be updated later according to the feedback of the driver.

Referring to (a) of FIG. 10, the left-direction boundary value coefficient may increase as the steering angle increases regardless of whether the steering direction is a left or right direction. The left-direction boundary value coefficient may increase in response to the steering angle more sensitively when the steering direction is the left direction than when the steering direction is the right direction. Similarly, referring to (b) of FIG. 10, the right-direction boundary value coefficient may increase in response to the steering angle more sensitively when the steering direction is the right direction than when the steering direction is the left direction.

The relationship 1001 between the steering angle and the left-direction boundary value coefficient and the relationship 1011 between the steering angle and the right-direction boundary value shown in (a) and (b) of FIG. 10 are merely one example, and the present disclosure is not limited thereto.

Figure 11:
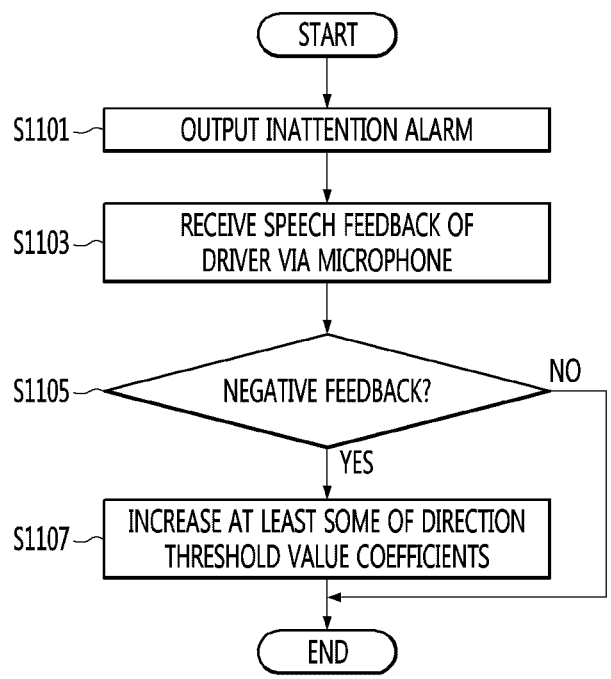
FIG. 11 is a view illustrating a method of updating a third reference range according to an embodiment of the present disclosure.

FIG. 11 is a view illustrating a method of updating a third reference range according to an embodiment of the present disclosure.

The method of updating the third reference range may be performed subsequently to the method of determining the inattention of the driver shown in FIG. 5.

Referring to FIG. 11, the processor 180 of the artificial intelligence apparatus 100 outputs the inattention alarm (S1101). This step corresponds to step S515 of outputting the inattention alarm shown in FIG. 5.

In addition, the processor 180 of the artificial intelligence apparatus 100 receives speech feedback of the driver via the microphone 122 (S1103).

The speech feedback of the driver may be neutral feedback unrelated to the inattention alarm, such as talking to a passenger or singing a song, positive feedback on the inattention alarm, or negative feedback on the inattention alarm. The neural feedback means that speech feedback on the inattention alarm is not provided, and the positive feedback and the negative feedback provide speech feedback indicating satisfaction with or evaluation of the inattention alarm.

The speech feedback may include implicit speech feedback as well as explicit speech feedback. For example, if the driver makes a negative sound such as sighing, kicking their tongue or yelling, the processor 180 may determine this as negative feedback.

Alternatively, the processor 180 may receive, as feedback, change in expression of the driver in the image data received via the camera 121. For example, if the driver frowns after the output of the inattention alarm, the processor 180 may receive this as negative feedback.

In one embodiment, the processor 180 of the artificial intelligence apparatus 100 may output speech requesting an evaluation of determination of the inattention status via the sound output module 152 in order to induce the speech feedback of the driver, and obtain speech feedback as the response of the driver.

In addition, the processor 180 of the artificial intelligence apparatus 100 determines whether the received speech feedback is negative feedback (S1105).

If the speech feedback is a negative feedback as the result of determination of step S1105, the processor 180 of the artificial intelligence apparatus 100 increases at least some of the direction threshold value coefficients (S1107).

The direction threshold value coefficients may be set for each driver and are used to determine the third reference range from the second reference range. If the inattention alarm is output but negative feedback is received from the driver in a specific situation, it is necessary to determine that the driver is not in the inattention status. Accordingly, it is possible to widen the third reference range, by increasing at least some of the direction threshold value coefficients used to determine the third reference range.

For example, assume that, in the second reference range, the right-direction threshold value and the left-direction threshold value are 60 degrees and the upward-direction threshold value and the downward-direction threshold value are 30 degrees. In addition, in a situation in which the driver turns on the right turn sign lamp to turn right, the right-direction threshold value coefficient is 2, and the left-direction threshold value coefficient, the upward-direction threshold value coefficient and the downward-direction threshold value coefficient are 1.5. Therefore, assume that, in the third reference range, the right-direction threshold value is 120 degrees, the left-direction threshold value is 90 degrees and the upward-direction threshold value and the downward-direction threshold value are 45 degrees. When the driver turns their head to the left side by 95 degrees in order to view the left window or the left side-view mirror to turn right, the processor 180 may determine that the face direction is out of the third reference range and output the inattention alarm. In addition, if the driver provides negative speech feedback, the processor 180 may increase the left-direction threshold value coefficient from 1.5 to 1.6 such that the left-direction threshold value is changed from 90 degrees to 95 degrees or more in the third reference range.

Since the profile is managed for each driver, the direction threshold value coefficients may be set and updated for each driver. Accordingly, the third reference range may be determined for each driver.

If the speech feedback is not a negative feedback as the result of determination of step S1105, the processor 180 of the artificial intelligence apparatus 100 ends the procedure without a separate updating procedure.

However, in some embodiments, the processor 180 of the artificial intelligence apparatus 100 may narrow the third reference range by decreasing the direction threshold value coefficients over time, even if feedback other than negative feedback is received from the driver. If the third reference range only widens based on negative feedback of the driver, there is no method of narrowing the widened third reference range again, and misjudge of false negatives of not recognizing the inattention of the driver may occur even if the driver is actually in the inattention status.

Even if the direction threshold value coefficients decrease over time, a decreased limit may be an initial value. Although each direction threshold value coefficients are managed for each driver, the initial value is set before the direction threshold value coefficients are managed for each driver. That is, the initial values of the direction threshold value coefficients may be equally set for all drivers. In addition, the lower limit of each direction threshold value coefficient over time may be set to an initial value.

FIG. 12 is a view illustrating a relationship between an updated steering angle and a directional boundary value coefficients based on negative feedback according to an embodiment of the present disclosure.

Referring to FIG. 12, the relationship between the steering angle and the direction boundary value coefficients may be updated based on the negative feedback of the driver. Similarly to FIG. 10, in FIG. 12, the steering angle is represented on the x-axis and the positive direction of the x-axis means the steering angle in the right direction, and the negative direction of the x-axis means the steering angle in the left direction. In addition, one column of the x-axis may be 10 degrees. In FIG. 12, the direction boundary value coefficient is represented on the y-axis and one column of the y-axis may be 1.

(a) of FIG. 12 shows before the relationship between the steering angle and the left-direction boundary value coefficient is updated 1201 and after update is performed by negative feedback of the driver 1202, and (b) of FIG. 12 shows a basic value 1211 between the relationship between the steering angle and the right-direction boundary value coefficient and a value 1212 updated by negative feedback of the driver. When negative feedback of the driver is received, the processor 180 may not incorrectly determine that the driver is in the inattention status in the same situation, by increasing at least some of the direction boundary value coefficients.

Figure 13:
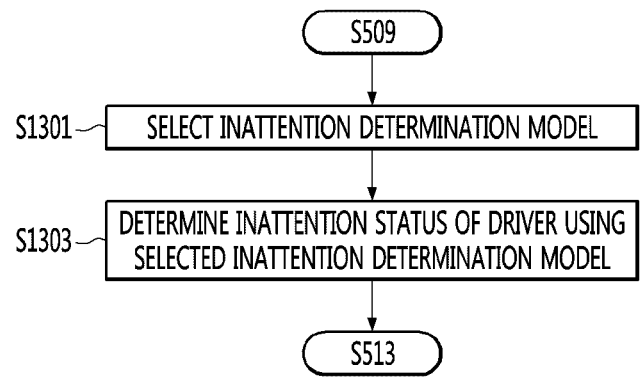
FIG. 13 is a flowchart illustrating an example of step S511 of determining inattention of the driver shown in FIG. 5.

FIG. 13 is a flowchart illustrating an example of step S511 of determining inattention of the driver shown in FIG. 5.

FIG. 13 shows an example of the method of determining the inattention of the driver using a neural network based inattention determination model among the methods of determining the inattention of the driver.

Referring to FIG. 13, the processor 180 of the artificial intelligence apparatus 100 selects an inattention determination model to be used to determine the inattention of the driver (S1301).

The inattention determination model may mean a model for determining the inattention of the driver based on the artificial neural network learned using a machine learning algorithm or a deep learning algorithm. The inattention determination model may be classified according to the type of the vehicle and may also be classified according to the driver.

In another embodiment, input of the inattention determination model may include the vehicle type (or vehicle identification information) and driver information (or driver identification information) and thus even a single inattention determination model may determine inattention classified according to vehicles and drivers.

The inattention determination model may be directly learned in the learning processor 130 of the artificial intelligence apparatus 100 and stored in the memory 170. Alternatively, the learning processor 240 of the artificial intelligence server 200 may learn the inattention determination model, and the artificial intelligence apparatus 100 may receive the learned inattention determination model via the communication unit 110 and store the inattention determination model in the memory 170.

The inattention determination model may be learned using training data labeled with whether the driver is in the inattention status, with respect to a combination of movement information of various movement driver's seats, driver status information and vehicle status information. The movement information of the driver's seat, the driver status information and the vehicle status information may configure an input feature vector. For example, one training data may include information indicating that the driver is not in the inattention status as label data, and the position of the driver's seat is +3 cm (or 3 cm up), the face direction and gaze direction of the driver are 0 degrees in a vertical direction and 30 degrees in a horizontal direction (or 30 degrees in the right direction), the distance between the eyelids of the driver is 10 mm, and the distance between the lips of the driver is 0 mm as an input feature vector.

The processor 180 may select an inattention determination model corresponding to the vehicle and the current driver among the plurality of inattention determination models stored in the memory 170. To this end, the processor 180 may identify the driver from the received image data using a face recognition model or a face identification model and select an inattention determination model corresponding to the identified driver. In addition, the processor 180 may select the inattention determination model corresponding to the current vehicle based on the vehicle identification information obtained from the ECU of the vehicle or predetermined vehicle identification information.

In addition, the processor 180 of the artificial intelligence apparatus 100 determines the inattention status of the driver using the selected inattention determination model (S1303).

Specifically, the processor 180 may input the generated movement information of the driver's seat, the generated driver status information and the received vehicle status information to the input layer of the selected inattention determination model, and determine whether the driver is in the inattention status based on the output of the output layer of the selected inattention determination model. The inattention determination model determines whether the driver is in the inattention status or not and thus may be implemented as a classification model.

Figure 14:
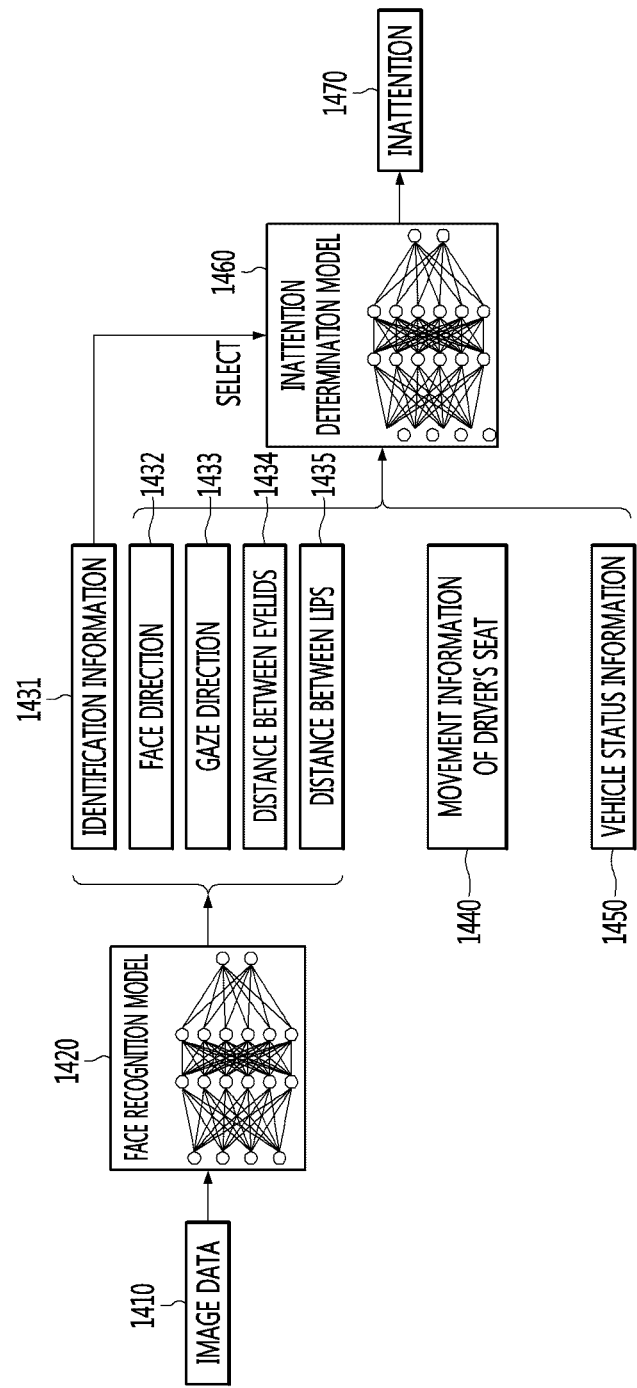
FIG. 14 is a view illustrating a method of determining inattention of a driver according to an embodiment of the present disclosure.

FIG. 14 is a view illustrating a method of determining inattention of a driver according to an embodiment of the present disclosure.

Referring to FIG. 14, the processor 180 of the artificial intelligence apparatus 100 may obtain (or generate) driver status information such as identification information 1431, a face direction 1432, a gaze direction 1433, a distance between eyelids 1434, a distance between lips 1435, by inputting the received image data 1410 to a face recognition model 1420.

In addition, the processor 180 may select an inattention determination model 1460 corresponding to a driver using the identification information 1431.

In addition, the processor 180 may determine the inattention of the driver 1470, by inputting the obtained driver status information, the movement information 1440 of the driver's seat and the vehicle status information 1450 to the selected inattention determination model 1460.

Figure 15:
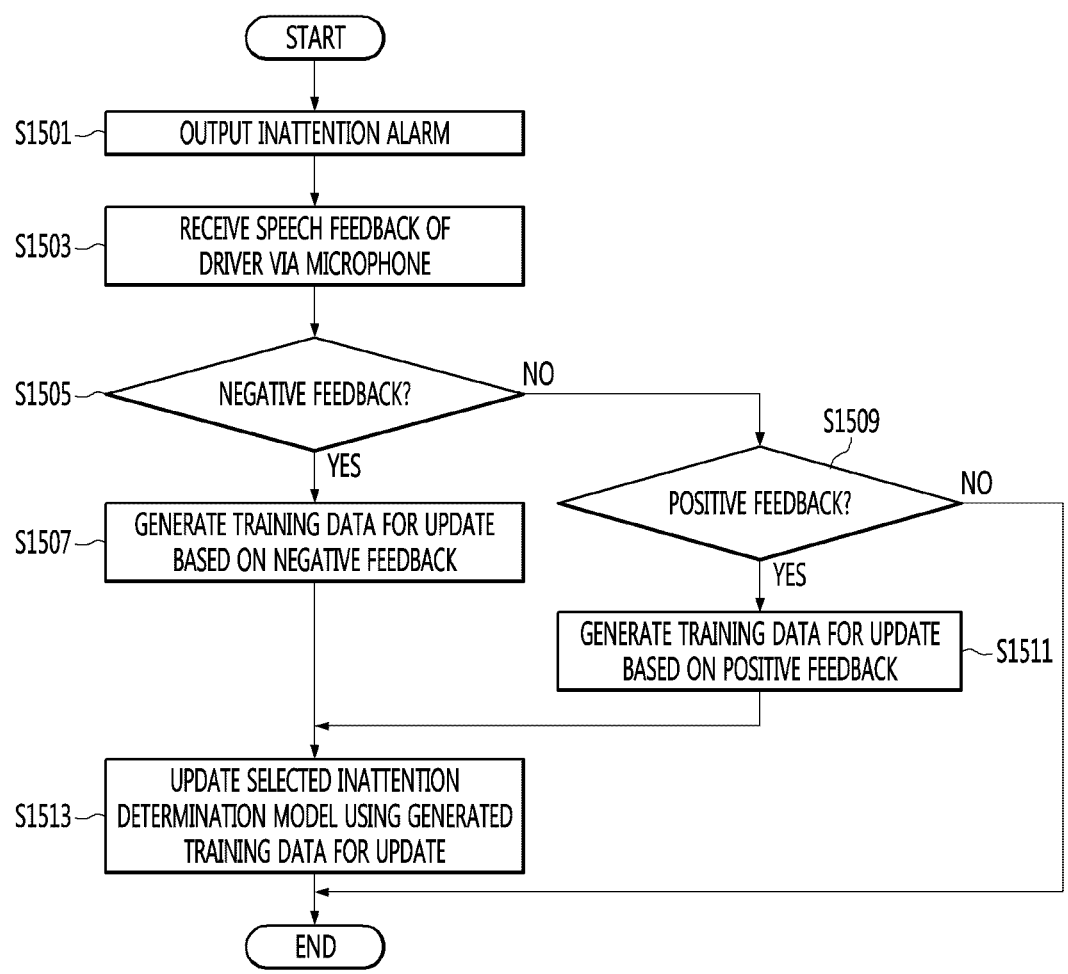
FIG. 15 is a view illustrating a method of updating an inattention determination model according to an embodiment of the present disclosure.

FIG. 15 is a view illustrating a method of updating an inattention determination model according to an embodiment of the present disclosure.

The method of updating the inattention determination model may be performed subsequently to the method of determining the inattention of the driver shown in FIG. 5.

Referring to FIG. 15, the processor 180 of the artificial intelligence apparatus 100 outputs the inattention alarm (S1501). This step corresponds to step S515 of outputting the inattention alarm shown in FIG. 5 or step S1101 of outputting the inattention alarm shown in FIG. 11.

In addition, the processor 180 of the artificial intelligence apparatus 100 receives speech feedback of the driver via the microphone 122 (S1503). This step corresponds to step S1103 of receiving the speech feedback shown in FIG. 11.

In addition, the processor 180 of the artificial intelligence apparatus 100 determines whether the received speech feedback is negative feedback (S1505). This step corresponds to step S1105 of determining whether the speech feedback is negative feedback, which is shown in FIG. 11.

If the speech feedback is negative feedback as the result of determination of step S1505, the processor 180 of the artificial intelligence apparatus 100 generates training data for update based on the negative feedback (S1507).

The processor 180 may generate training data for update, by including a label indicating that the driver is not in the inattention status in the above state according to the movement information of the driver's seat, the driver status information and the vehicle status information, which are used to determine that the driver is in the inattention status, and the negative feedback of the driver. The generated training data for update may be used only to update the inattention determination model corresponding to the driver. Therefore, it is possible to establish an inattention determination model optimized for each driver.

If the speech feedback is not negative feedback as the result of determination of step S1505, the processor 180 of the artificial intelligence apparatus 100 determines whether the received speech feedback is positive feedback (S1509).

If the speech feedback is positive feedback as the result of determination of step S1509, training data for update based on the positive feedback is generated (S1511).

The processor 180 may generate training data for update with a label indicating that the driver is in the inattention status in the above status according to the movement information of the driver's seat, the driver status information and the vehicle status information, which are used to determine that the driver is in the inattention status, and the negative feedback of the driver. Similarly, the generated training data for update may be used only to update the inattention determination model corresponding to the driver.

After the training data for update is generated, the processor 180 of the artificial intelligence apparatus 100 updates the selected inattention determination model using the generated training data for update (S1513).

The processor 180 of the artificial intelligence apparatus 100 may update the selected inattention determination model, by updating the model parameter of the selected inattention determination model using the training data for update generated directly or using the learning processor 130.

Alternatively, the processor 180 of the artificial intelligence apparatus 100 may transmit the generated training data for update and the selected inattention determination model to the artificial intelligence server 200 via the communication unit 110, and the processor 260 or the learning processor 240 of the artificial intelligence server 200 may update the model parameter of the received inattention determination model using the received training data for update, and the processor 180 of the artificial intelligence apparatus 100 may update the selected inattention determination model, by receiving the updated inattention determination model from the artificial intelligence server 200 via the communication unit 110.

If the training data for update is not generated, the procedure ends without performing a separate update procedure.

However, in some embodiments, the processor 180 of the artificial intelligence apparatus 100 may narrow the third reference range by decreasing each direction threshold value coefficient over time even if feedback other negative feedback is received from the driver. If the third reference range only widens based on negative feedback of the driver, there is no method of narrowing the widened third reference range again, and misjudge of false negatives of not recognizing the inattention of the driver may occur even if the driver is actually in the inattention status.

According to various embodiments of the present disclosure, it is possible to reduce the risk of an accident and provide for the safety of a driver, by providing an inattention alarm upon determining that the driver is in the inattention status while the vehicle travels.

According to various embodiments of the present disclosure, since the inattention status is determined in consideration of different driving habits of the drivers, it is possible to determine the inattention status appropriate for each driver and to increase inattention determination accuracy.

According to various embodiments of the present disclosure, it is possible to determine inattention appropriate for individual drivers, by updating a criterion or model used to determine inattention based on feedback of a driver.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence apparatus for determining inattention of a driver, comprising:
    a vibration sensor or a gyro sensor configured to sense movement of a driver's seat of a vehicle;
    a camera configured to receive image data including a face of a driver;
    a communication modem configured to receive vehicle status information from an ECU (Electronic Control Unit) of the vehicle; and
    a processor configured to:
        generate movement information of the driver's seat using vibration sensor information received from the vibration sensor or gyro sensor information received from the gyro sensor,
        generate driver status information corresponding to the driver from the received image data, determine whether the driver is in an inattention status based on the movement information of the driver's seat, the driver status information and the vehicle status information, and output an inattention alarm when the driver is in the inattention status, where the processor is further configured to:

select an inattention determination model to be used to determine inattention of the driver in consideration of a type of the vehicle and identification information of the driver, and determine inattention of the driver using the selected inattention determination model, wherein the inattention determination model includes an artificial neural network, and is learned using a machine learning algorithm or a deep learning algorithm.

2. The artificial intelligence apparatus of claim 1, wherein the processor is configured to generate, as the driver status information, at least one of identification information of the driver, a face direction of the driver, a gaze direction of the driver, a distance between eyelids of the driver or a distance between lips of the driver from the image data using a face recognition model, and wherein the face recognition model includes a convolutional neural network (CNN) learned using a deep learning algorithm.

3. The artificial intelligence apparatus of claim 2, wherein the vehicle status information includes at least one of a speed of the vehicle, a revolution per minute (RPM) of an engine, a transmission gear state, pedal pressure, a steering angle or a lighting state of a turn signal lamp.

4. The artificial intelligence apparatus of claim 1, wherein the inattention determination model is learned using training data which includes an input feature vector including at least one of the face direction, the gaze direction, the distance between the eyelids, the distance between the lips, the movement information of the driver's seat or the vehicle status information, and a labeled inattention corresponding to the input feature vector.

5. The artificial intelligence apparatus of claim 4, further comprising a microphone, wherein the processor is configured to:
receive speech feedback of the driver via the microphone after the inattention alarm is output,
when the speech feedback is negative feedback, generate training data for update based on the negative feedback,
when the speech feedback is positive feedback, generate training data for update based on the positive feedback, and
update the inattention determination model using the generated training data for update.

6. A method of determining inattention of a driver, comprising:

sensing movement of a driver's seat of a vehicle using a vibration sensor or a gyro sensor;

generating movement information of the driver's seat using vibration sensor information received from the vibration sensor or gyro sensor information received from the gyro sensor;

receiving image data including a face of a driver from a camera;

generating driver status information corresponding to the driver from the received image data;

receiving vehicle status information from an ECU (Electronic Control Unit) of the vehicle;

determining whether the driver is in an inattention status based on the movement information of the driver's seat, the driver status information and the vehicle status information; and outputting an inattention alarm when the driver is in the inattention status, wherein the determining whether the driver is in the inattention status comprises:
selecting an inattention determination model to be used to determine inattention of the driver in consideration of a type of the vehicle and identification information of the driver, and
determining inattention of the driver using the selected inattention determination model wherein the inattention determination model includes an artificial neural network, and is learned using a machine learning algorithm or a deep learning algorithm.

7. A non-transitory recording medium stored thereon a computer program for controlling a processor to perform a method of determining inattention of a driver, the method comprising:

sensing movement of a driver's seat of a vehicle using a vibration sensor or a gyro sensor;

generating movement information of the driver's seat using vibration sensor information received from the vibration sensor or gyro sensor information received from the gyro sensor;

receiving image data including a face of a driver from a camera;

generating driver status information corresponding to the driver from the received image data;

receiving vehicle status information from an ECU (Electronic Control Unit) of the vehicle;

determining whether the driver is in an inattention status based on the movement information of the driver's seat, the driver status information and the vehicle status information; and outputting an inattention alarm when the driver is in the inattention status, wherein the determining whether the driver is in the inattention status comprises:
selecting an inattention determination model to be used to determine inattention of the driver in consideration of a type of the vehicle and identification information of the driver, and
determining inattention of the driver using the selected inattention determination model, wherein the inattention determination model includes an artificial neural network, and is learned using a machine learning algorithm or a deep learning algorithm.

* * * * *